(12) United States Patent
Anderson et al.

(10) Patent No.: US 10,089,625 B2
(45) Date of Patent: Oct. 2, 2018

(54) SYSTEMS AND METHODS FOR TOKENIZING FINANCIAL INFORMATION

(71) Applicant: First Data Corporation, Greenwood Village, CO (US)

(72) Inventors: William D. Anderson, Omaha, NE (US); Vijay Kumar Royyuru, Norristown, PA (US); Bradley T. Masterson, Elkhorn, NE (US); J. Scott Sanchez, Atlanta, GA (US)

(73) Assignee: First Data Corporation, Greenwood Village, CO (US)

( * ) Notice: Subject to any disclaimer, the term of this patent is extended or adjusted under 35 U.S.C. 154(b) by 1086 days.

(21) Appl. No.: 13/801,494

(22) Filed: Mar. 13, 2013

(65) Prior Publication Data
US 2013/0339240 A1   Dec. 19, 2013

Related U.S. Application Data

(60) Provisional application No. 61/659,289, filed on Jun. 13, 2012.

(51) Int. Cl.
*G06Q 40/00* (2012.01)
*G06Q 20/40* (2012.01)
*G06Q 40/02* (2012.01)
*G06Q 20/32* (2012.01)

(52) U.S. Cl.
CPC ......... *G06Q 20/40* (2013.01); *G06Q 20/3223* (2013.01); *G06Q 20/4014* (2013.01); *G06Q 40/02* (2013.01)

(58) Field of Classification Search
CPC .... G06Q 20/40; G06Q 20/3821; G06Q 20/12; G06Q 20/3674; G06Q 20/02; G06Q 40/02
USPC .................... 705/44, 75, 76, 39, 67
See application file for complete search history.

(56) References Cited

U.S. PATENT DOCUMENTS

| | | | | |
|---|---|---|---|---|
| 3,876,864 | A * | 4/1975 | Clark ...................... | G07F 19/20 235/379 |
| 5,217,088 | A * | 6/1993 | Dallman ................. | G07F 19/20 186/37 |
| 5,557,518 | A * | 9/1996 | Rosen ..................... | G06Q 20/02 235/375 |
| 7,322,516 | B2 * | 1/2008 | Savage .............. | G06Q 20/1085 235/379 |

(Continued)

OTHER PUBLICATIONS

Anonymous "DigiMo Pioneers First True Mobile Payment Solution", M2 Presswire, NA, May 5, 2011 (Year: 2011).*

*Primary Examiner* — Kelly Scaggs Campen
(74) *Attorney, Agent, or Firm* — Eversheds-Sutherland (US) LLP

(57) ABSTRACT

Systems and methods for tokenizing financial information are provided, including embodiments relating to authorizing payment or sale transactions using verbal recognition of a customer or user. In some embodiments, a payment transaction service provider system may receive payment authorization information from a user device. The payment authorization information may include a recording. The payment authorization information may be authenticated based at least in part on the recording. A payment credential may be communicated in response to authenticating the payment authorization information.

8 Claims, 4 Drawing Sheets

(56) References Cited

U.S. PATENT DOCUMENTS

| | | | | |
|---|---|---|---|---|
| 8,666,895 B2* | 3/2014 | Grigg | ............ | G06Q 20/20 |
| | | | | 235/380 |
| 8,862,508 B2* | 10/2014 | Maiorino | ............ | G06Q 40/02 |
| | | | | 705/35 |
| 8,972,286 B2* | 3/2015 | Grigg | ............ | G06Q 20/20 |
| | | | | 705/26.1 |
| 9,235,839 B2* | 1/2016 | Dua | ............ | G06Q 20/20 |
| 9,355,393 B2* | 5/2016 | Purves | ............ | G06Q 20/105 |
| 2005/0240522 A1* | 10/2005 | Kranzley | ............ | G06Q 20/02 |
| | | | | 705/40 |
| 2007/0145115 A1* | 6/2007 | Savage | ............ | G06O 20/1085 |
| | | | | 235/379 |
| 2007/0185718 A1* | 8/2007 | Di Mambro | ............ | G06F 21/32 |
| | | | | 704/273 |
| 2012/0197740 A1* | 8/2012 | Grigg | ............ | G06Q 20/20 |
| | | | | 705/16 |
| 2012/0197743 A1* | 8/2012 | Grigg | ............ | G06Q 20/20 |
| | | | | 705/16 |
| 2013/0054457 A1* | 2/2013 | Strickland | ............ | G07F 15/005 |
| | | | | 705/44 |

* cited by examiner

SYSTEMS AND METHODS FOR TOKENIZING FINANCIAL INFORMATION

RELATED APPLICATIONS

This application claims priority to U.S. Provisional Patent Application No. 61/659,289, entitled "Systems and Methods for Tokenizing Financial Information," filed on Jun. 13, 2012, the contents of which are incorporated by reference herein in their entirety.

TECHNICAL FIELD

Embodiments of the disclosure relate generally to authorizing sale transactions using verbal recognition of a customer.

BACKGROUND

Mobile devices, such as cell phones, personal digital assistants ("PDAs"), smart phones, tablets and other similar programmable electronic devices are increasingly utilized to provide additional functionality beyond traditional voice communications. For example, purchasing transactions are implemented using mobile devices and techniques to secure those transactions in an interactive manner are desirable.

BRIEF DESCRIPTION OF THE DISCLOSURE

Certain embodiments of the disclosure may address some or all of the above needs. Certain embodiments of the disclosure may provide systems and methods for authorizing sale transactions using verbal recognition of a user. In one embodiment, a computer-implemented method may include a payment transaction service provider system comprising one or more computers receiving payment authorization information from a user device. The payment authorization information may include a recording. Further, the payment authorization information may be authenticated based at least in part on the recording. A payment credential may be communicated in response to authenticating the payment authorization information.

In one aspect of an embodiment, the recording may include a word or an authorization phrase.

In one aspect of an embodiment, an indication may be received indicating that a user of the user device is authorized by a merchant to receive a purchasing incentive. Further, the purchasing incentive may be associated with the payment credential based at least in part on the indication.

In one aspect of an embodiment, the payment credential may include at least one of (i) a bank account number, (ii) a credit card account number, or (iii) a financial services account identifier.

In one aspect of an embodiment, the payment transaction service provider system may communicate to the user device an indication of payment authorization. In one aspect of the embodiment, the indication of payment authorization may be (i) an encrypted key or (ii) a token.

In one aspect of an embodiment, authenticating the payment authorization information may further include analyzing the recording based at least in part on a stored recording.

In another embodiment, a computer-implemented method may include a user device including one or more processors communicating order information for a proposed payment transaction. The order information may be based at least in part on an indication from a user for one or more items to purchase. Further, the computer-implemented method may include communicating payment authorization information to a payment transaction service provider system. The payment authorization information may include a recording. The computer-implemented method may include receiving a payment credential for the proposed payment transaction from a payment transaction service provider system. The computer-implemented method may include communicating the payment credential to a merchant.

In one aspect of an embodiment, the recording may include a recording of a name or an authorization phrase.

In one aspect of an embodiment, the computer-implemented method may include capturing the recording. In one aspect of the embodiment, the recording may include a verbal command from the user. Further, the embodiment may include validating the verbal command.

In one aspect of an embodiment, the computer-implemented method may include receiving a purchasing incentive associated with the payment credential based at least in part on a merchant authorizing the purchasing incentive.

In one aspect of an embodiment, the computer-implemented method may include receiving an electronic receipt from the merchant.

In one embodiment, one or more computer-readable media may be provided. The one or more computer-readable media may be configured to store computer-executable instructions. When executed by one or more processors, the computer-executable instructions may configure the one or more processors to receive payment authorization information from a user device. The payment authorization information may include a recording. Further, the computer-executable instructions may configure the one or more processors to authenticate the payment authorization information based at least in part on the recording. The computer-executable instructions may configure the one or more processors to communicate a payment credential in response to authenticating the payment authorization information.

In one aspect of an embodiment, the recording may include a word or an authorization phrase.

In one aspect of an embodiment, the computer-executable instructions may configure the one or more processors to receive an indication that a user of the user device is authorized by a merchant to receive a purchasing incentive. Further, the computer-executable instructions may configure the one or more processors to associate the purchasing incentive with the payment credential based at least in part on the indication.

In one aspect of an embodiment, the payment credential may include at least one of (i) a bank account number, (ii) a credit card account number, or (iii) a financial services account identifier.

In one aspect of an embodiment, the computer-executable instructions may configure the one or more processors to communicate an indication of payment authorization to the user device. Further, the indication of payment authorization may be one of (i) an encrypted key or (ii) a token.

In one aspect of an embodiment, the computer-executable instructions may configure the one or more processors to authenticate the payment authorization information, which may include analyzing the recording based at least in part on a stored recording.

In one embodiment, one or more computer-readable media may be provided. The one or more computer-readable media may be configured to store computer-executable instructions. When executed by one or more processors, the computer-executable instructions may configure the one or more processors to communicate order information for a proposed payment transaction. The order information may be based at least in part on an indication from a user for one or more items to purchase. The computer-executable instructions may configure the one or more processors to communicate payment authorization information. The payment authorization information may include a recording. The computer-executable instructions may configure the one or more processors to receive, from a payment transaction service provider system, a payment credential for the proposed payment transaction. The computer-executable instructions may configure the one or more processors to communicate the payment credential to a merchant.

In one aspect of an embodiment, the recording may include a recording of a name or an authorization phrase.

In one aspect of an embodiment, the computer-executable instructions may configure the one or more processors to capture the recording. In one aspect of the embodiment, the recording may include a verbal command from the user. Further, the computer-executable instructions may configure the one or more processors to validate the verbal command. In one aspect of an embodiment, the computer-executable instructions may configure the one or more processors to receive a purchasing incentive associated with the payment credential based at least in part on a merchant authorizing the purchasing incentive.

In one aspect of an embodiment, the computer-executable instructions may configure the one or more processors to receive an electronic receipt from the merchant.

Additional systems, methods, apparatuses, features, and aspects are realized through the techniques of various embodiments of the disclosure. Other embodiments and aspects of the disclosure are described in detail herein and are considered a part of the claimed disclosure. Other features and aspects can be understood with reference to the description and to the drawings.

BRIEF DESCRIPTION OF THE FIGURES

The detailed description is set forth with reference to the accompanying drawings. The use of the same reference numerals indicates similar or identical components or elements; however, different reference numerals may be used as well to indicate components or elements which may be similar or identical. Various embodiments of the disclosure may utilize elements and/or components other than those illustrated in the drawings, and some elements and/or components may not be present in various embodiments. Depending on the context, singular terminology used to describe an element or a component may encompass a plural number of such elements or components and vice versa.

DETAILED DESCRIPTION

Embodiments of the disclosure now will be described more fully hereinafter with reference to the accompanying drawings, in which embodiments are shown. The subject matter of this disclosure may be embodied in many different forms and should not be construed as limited to the embodiments set forth herein; rather, these embodiments are provided so that this disclosure will be thorough and complete, and will fully convey the scope of the disclosure to those skilled in the art. Like numbers refer to like elements throughout.

Figure 1:
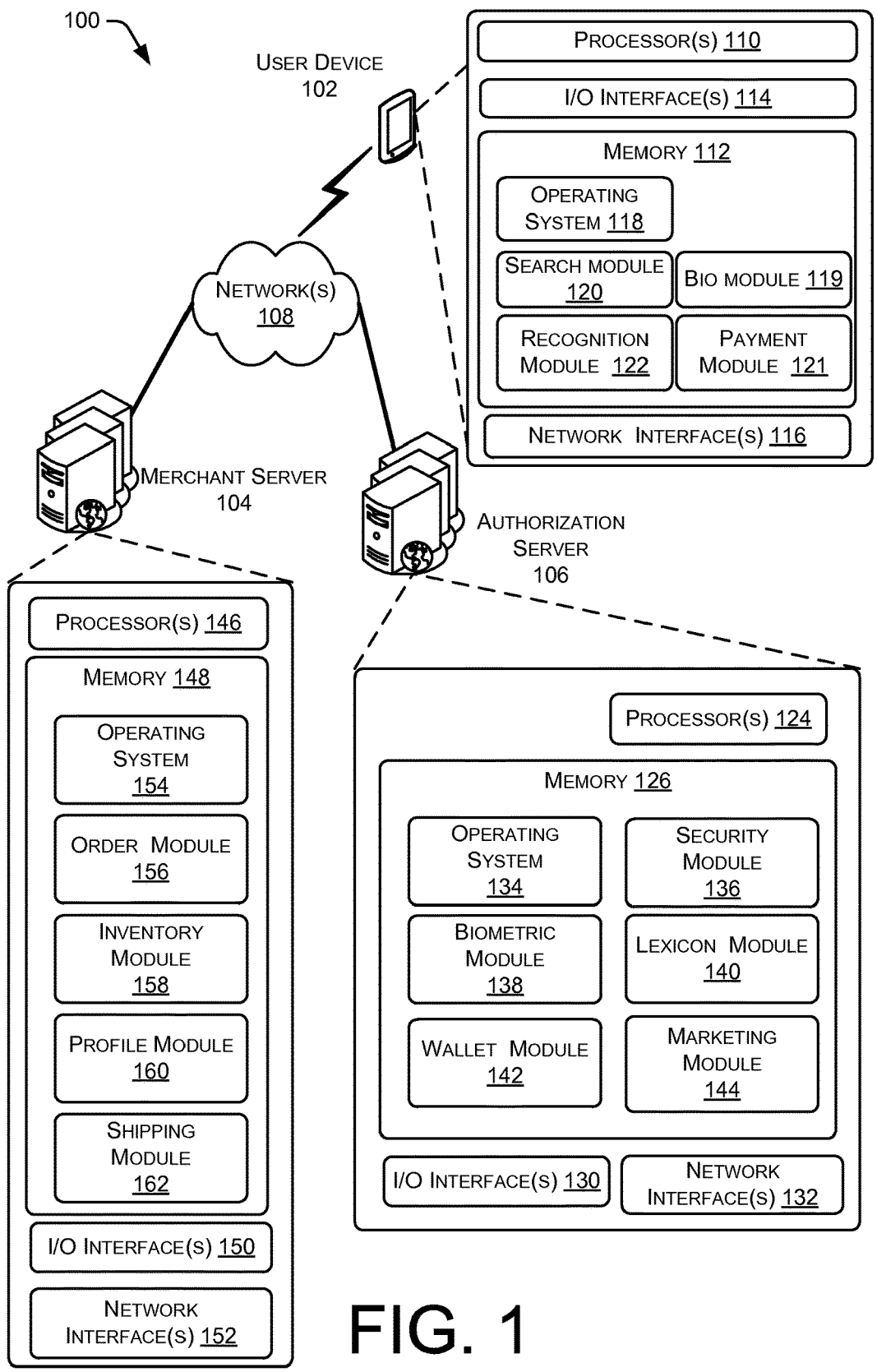
FIG. 1 illustrates a block diagram of a payment transaction service provider system in accordance with various embodiments of the disclosure.

FIG. 1 represents a block diagram of an example payment transaction service provider system 100 for authorizing financial transactions using a user device 102, a merchant sever 104, and an authorization server 106. All of the system components may be in communication with each other via a network 108.

The user device 102 may include any number of processor-driven devices, including but not limited to, a desktop computer, a personal computer, a laptop computer, a mobile computer, tablet, phone, or any other programmable processor-based device. In addition to having one or more processors 110, the user device 102 may further include one or more memory devices 112, input/output ("I/O") interface(s) 114, and network interface(s) 116. The memory 112 may be any computer-readable medium, coupled to the processor(s) 110, such as RAM, ROM, and/or a removable storage device for storing data files and a database management system ("DBMS") to facilitate management of data files and other data stored in the memory 112 and/or stored in one or more separate databases. The memory 112 may also store various program modules, such as an operating system ("OS") 118, a voice recognition module 122, and a search module 120 that interfaces with the online marketplace to find products to be purchased by the user device 102. The OS may be, but is not limited to, Microsoft Windows®, Apple OSX™, Unix, a mainframe computer operating system (e.g., IBM z/OS, MVS, OS/390, etc.), or a specially designed operating system. Each of the interfaces and modules may comprise computer-executable program instructions or software, including a dedicated program, for receiving, storing, extracting, managing, processing, and analyzing communications associated with initiating and completing purchasing transactions. The modules may include a bio module 119, a search module 120, a payment module 121 and a voice recognition module 122.

The bio module 119 may receive biometric data from the user of the user device 102. The biometric data may include audio, image, and video provided by the user. For example, the user may request audio authorization to initiate or approve a transaction. The bio module 119 may provide an interface prompt and ask the user to state their password or pass phrase. The bio module 119 may store the audio sample on the user device 102 and send the sample to the authorization server 106 for validation. In addition to the audio sampling, the bio module 119 may prompt the user to take a picture using their user device 102. The picture may be of the users face, eye, or any other physical feature (e.g., fingerprint) that may be used to confirm the identity of the user. Further, the bio module 119 may prompt the user to record a video image of their face or eyes and to speak a password or pass phrase. The picture or video recording may be provided to the authorization server 106 for validation.

The search module 120 provides a broad capability of interfacing with the online marketplace. The search module 120 may generate product queries to search for specific products and then present the products to the user for their consideration. The search module 120 may also initiate a purchasing transaction to complete an order for the product. For example, in one embodiment, the user wants to purchase a book and provides the query that may include the title, author, or genre of the book to the search module 120. The search module 120 sends a query via the network to the merchant server 104 and receives information associated with the book. The search module 120 may be directed to purchase the book from the merchant server 104. The merchant server 104 may authorize the transaction upon receiving the appropriate purchasing credentials from the user device 102.

In one embodiment, the user device 102 may include a payment module 121 that may store a variety of payment instruments or references to payment instruments. For example, the payment module 121 may store which payment instruments are available to make payments. But, the payment account information or numbers may not be stored on the user device directly. Therefore, the payment module 121 may provide an indication of which payment instruction could be used to initiate a transaction. However, the user device 102 would have to access the authorization server 106 to obtain the account numbers to complete the transaction. In another embodiment, the account numbers may be stored directly on the user device 102. Therefore, any purchasing transaction may be completed by the user device 102 without having to access the authorization server 106.

In another embodiment, the user device 102 incorporates the voice recognition module 122 into the purchasing process. The voice recognition module 122 may include any number of suitable software modules and/or applications that facilitate the provisioning and processing of verbal instructions directed to the user device 102. In one example operation, the user may verbally request the user device 102 to search for a book. The voice recognition module 122 will analyze the command and direct the search module 120 to generate a search query to find the book within the online marketplace. The search query may be based on the title of the book, the author, or even the genre. For example, the user may instruct the user device 102 to "find a book by Tom Clancy" or "find a book called The Hunt for Red October" or "find a book on Russian submarines." The query results may be presented on a display of the user device 102. The results may include the title, author name, and or the genre. Accordingly, the user may instruct the user device 102 to "purchase the book by Tom Clancy." The voice recognition module 122 may discern the verbal command and select one or more books from the query results for books authored by Tom Clancy or the voice recognition module 122 may query the user to select a specific Tom Clancy book if more than one is available. After deciding to purchase the book, the voice recognition module 122 may receive a voice command to purchase the book. The voice recognition module 122 queries the user for a voice authentication sample and a method of payment. For example, the voice recognition module 122 may request the user to speak their name or an authorization phrase to confirm the user is authorized to make the purchase request. Further, the name or authorization phrase may be recorded and transferred over the network 108 to the authorization server 106 for authentication. Alternatively, the user device may request a password that may be manually entered into the user device 102 to prevent a nearby person from overhearing the authorization phrase.

The authorization server 106 may include one or more processors 124 and memory 126 that are similar in nature to those described above in the user device 102. The authorization server 106 may include: a server, one or more networked servers, a desktop computer, one or more networked desktop computers, a personal computer, a laptop computer, a mobile computer, or any other processor-based device. The authorization server 106 may also include a variety of network interfaces 132 to communicate with other computers over the network 108 and I/O interfaces 130 as described above for the user device 102. The memory 126 may include an operating system 134, a security module 136, a biometric module 138, a lexicon module 140, a wallet module 142 and a marketing module 144. The operating system 134 may be, but is not limited to, Microsoft Windows®, Apple OSX™, Unix, a mainframe computer operating system (e.g., IBM z/OS, MVS, OS/390, etc.), or a specially designed operating system.

The security module 136 may store voice recognition data that may be used to authenticate purchase requests from the user device 102. For example, the security module 136 may include the payment information or account information that may be a part of the payment credentials accepted by merchants for an online purchase. The payment or account information may specify banking accounts, credit card accounts, or financial services accounts that are linked to the banking accounts or credit card accounts that facilitate the electronic transfer of money for goods or services. Further, the security module 136 may also store the voice or biometric files that are compared with voice files provided by the user device 102. For example, the user device 102 may provide a voice file that includes an authorization phrase for the authorization server 106 to authenticate. The security module 136 may provide the stored voice file to the biometric module 138 for comparison with the received voice file. The biometric module 138 may determine if the voice samples match each other using Hidden Markov Models or neural networks. The security module 136 may provide the payment credentials to the user device 102 if the voice samples match. In one embodiment, the payment credentials may be specified in the authorization request from the user device 102 or they may be defaulted to the specific credential based at least in part on the content of the voice sample provided. For example, the user may elect to use specific credentials for a specific voice sample. For example, if the authorization phrase is "John has a long mustache" the security module may select the payment credentials associated with a first bank account or a credit card. If the authorization phrase is "molasses tomorrow will bring forth cognac," the security module 136 may select the payment credentials associated with a second bank account or credit card.

A lexicon module 140 may be used to interpret the speech files provided by the user device to implement commands or operations on the authorization server 106. For example, the authorization server 106 may also include a wallet module 142 that includes user financial information that may be used to complete online financial transactions with the merchant server 104. The wallet module 142 may include one or more credit cards, bank account information, or any other financial services information (e.g., Paypal™, Bit Coin . . . etc.) that the user may use to pay for, trade, or barter to obtain a good or service from a merchant. In conjunction with the lexicon module 140 the user may be able to manage, configure, or implement features of the wallet module 142 to execute financial transactions with the merchant server.

In one embodiment, the lexicon module 140 may interpret a word or phrases of words to initiate payments using one or more of the financial accounts (e.g., credit card) stored and/or managed by the wallet module 142. Conversely, the wallet module 142 or the lexicon module may provide questions to the user device 102 using an audio and/or text format to query information from the user related to the purchasing transaction or any other transaction being implemented by the authorization server 106. For example, the user may be viewing an item for sale on the merchant server 104 or viewing a list of items that have been selected for purchase. In one embodiment, the user could speak the word "purchase" and the lexicon module 140 may direct the wallet module 142 to initiate the purchasing transaction with the merchant server 104. The wallet module 142 may provide a response "Which credit card would you like to use to make this purchase?" The response may be in an audio format or a text format. The user may respond in a voice command (e.g., "use the debit card") or may select a text icon related to a specific credit card or payment method. Additional embodiments of interpreting voice commands from the user device or voice queries from the authorization server 106 are provided below in Tables I and II.

TABLE I

| Main word | Variations or Associations | Underlying activities or commands or rules |
| --- | --- | --- |
| Account | Bank | Non-traditional and traditional accounts used as a Payment instrument [Debit, Credit, Prepaid, etc . . . ] |
| Acquire | | |
| Amount | | |
| Approval | Approve | Mobile user authorizes to proceed with purchase |
| Brand Specific Cards | Card Names go here from wallet | |
| Buy | | Purchase [Goods & Services] |
| Cancel | | Cancel transaction or purchase |
| Card | | refers to any type of Payment instrument [Debit, Credit, Prepaid, etc . . . ] or Account type, use definition within credit card section |
| Change card | | refers Credit card, switch purchasing instrument to [Bank specific] credit card requested by Mobile user assuming card is within the wallet and biometrics is positive to approve change |
| Coupon | | Use wallet module 142, check marketing module 144 to check to see if coupon is available for use with this potential purchase |
| Credit card | | use wallet module 142 to identify credit card or other Payment instrument [Debit, Credit, Prepaid, etc. |
| Discounts | | Use wallet module 142 to check any other specific Coupons, {Bank Card specific} promotions on {Interest, use of card, or specific contests and etc.} |
| Member's price | | Special |
| Number of | | Quantity to purchase |
| Obtain | | See Purchase |
| Options | | Show purchasing options |
| Order | | Make a purchase |
| Pay | | Mobile user wants to purchase something. Validate mobile user using biometric setting stored in the authorization server 106, If validation is positive- begin purchasing process to authenticate transactions thorough authorization server 106. If validation is negative, ask to reconfirm and if that is still unsuccessful - manual identifier. |
| Pay for | see phrases below | Mobile user wants to purchase something. Validate mobile user using biometric setting stored in the authorization server 106, If validation is positive- begin purchasing process to authenticate transactions using wallet module 142. If validation is negative, ask to reconfirm and if that is still unsuccessful - manual identifier. |
| Payment | | Two meanings- [use specific financial instrument] or a field to for entry |
| Payment Amount | | Show payment amount |
| Payment Date | | Show payment date |
| Price | | Show price or cost |
| Procure | | See phrases below |
| Purchase | | See phrases below |
| Purchase Amount | | Show purchase amount |
| Purchase Price | | Show purchase price |
| Quantity | | Number of items to purchase |
| Rejection | | Cancel transaction or purchase |
| Select | | Produce a selection of items (e.g., credit cards) for selection |
| Ship to | | Show shipping address form |
| Shipping | | Show shipping options |
| Shipping Address | | Show shipping address form |

TABLE I-continued

| Main word | Variations or Associations | Underlying activities or commands or rules |
|---|---|---|
| Shipping status | | Show shipping status or tracking ID |
| Transfer | | Open wallet module 142 to transfer funds between accounts in the wallet module 142 |
| Use . . . | Using | Command to make a selection. For example, selecting one account to pay a payment |
| Wallet | | Used to store various facts associated with the wallet module 142, including, cards, loyalty, rewards, unused coupons |

TABLE II

| Verbal activites | Phrases | Variations or Associations | Underlying activities or commands or rules |
|---|---|---|---|
| Purchase | approve purchasing | Want to buy, Purchase for me, Procure for me authorize the [this] purchase Pay for For Payment Proceed with purchase | Mobile user wants to purchase something. Validate a mobile user using biometric setting stored in the cloud, If validation is positive- begin purchasing process to authenticate transactions thorough the authorization server 106. If validation is negative, ask to reconfirm and if that is still unsuccessful - manual identifier. |
| Purchase | Ask Question - "Do you want me to use this card going forward as the default or is this a one-time purchase?" | | If the user device 102 asks If "Yes" reset default [Bank Specific] credit card as new default within the wallet module 142. If "No" track number of times this card is used as replacement for future prompting |
| Purchase | Ask Question - "Do you want to purchase [goods & Services]?" | | Mobile devices ask the question - Do you want to purchase . . . |
| Purchase | Check to see if there are any discounts or coupons? | Any other discounts? Any coupons? Manufacturer's promotions? Bank card Specific specials or promotions or loyalty awards | Use wallet module 142, Check Offer-Wise product to validate additional options and provide feedback to mobile user. |
| Purchase | Fill out order form | | Go to wallet module 142, pull appropriate fields and place in correct fields within Web paper purchase form. If fields names are not the same, speak" Fields names are not the same, so I can not auto fill these fields!" if all fields match, enter data and notify mobile user updates are complete and ready for submission" |
| Purchase | fill shipping information out | | Go to wallet module 142, use Bill address on file for mobile user, assuming biometric validation is positive. Use alternative address only if biometric results are positive. |
| Wallet | Add cards to wallet | | Go to wallet module 142; add new entry for a new card for this wallet. Display changes on mobile device and update FDC |

TABLE II-continued

| Verbal activites | Phrases | Variations or Associations | Underlying activities or commands or rules |
|---|---|---|---|
| | | | information for this mobile user |
| Wallet | Change card | Change payment type | Mobile user request a different card be used for a specific purchase, identify card in wallet within wallet module 142 |
| Wallet | Remove Cards from wallet | | Go to wallet module 142, validate mobile user using biometric process, if positive, find specific [bank card] requested - remove from wallet once we reconfirm. I have found "Bank specific Card] in your wallet, do you still want to remove it?[Yes-proceed with removal, No- cancel removal process] |
| Wallet | Use [bank name specific] card | | Go to wallet module 142, Check wallet for card requested, Is card expired - If no proceed with biometric validation, if yes, "state card is expired" and offer to recommend an alternative. Alternative is next two most used cards. If yes to alternative 1 or 2, use suggestion card |
| Wallet | Check Cards in Wallet | What cards do I have in my wallet? List all cards within my wallet. | Go to wallet module 142, Check wallet for all cards present, Read names "only" of bank name and card name. No additional data is provided unless biometric validation has taken place and mobile user is authorized for additional data. |

A marketing module 144 may also be incorporated with the authorization server 106 to provide purchasing incentives for one or more merchants that may use the payment credentials provided by the security module 136. For example, purchasing incentives provided by the merchants maybe stored in the marketing module and they may be attached with the payment credentials when an authorized user attempts to purchase an item from the merchant. The purchasing incentives may enable a user to receive a discounted price, an additional item, or any other incentive that may be offered by the merchant to incentivize a purchase. The online merchant may provide authentication credentials for their purchasing incentives. For example, the purchasing incentives may include bar code numbers or a quick response code that are scanned into the user device 102 and submitted with a purchase request. The bar code and quick response code are machine-readable images that are attached to any object and may store information related to the object. The bar code may include a one dimensional representative of vertical lines that are configured to represent letters or numbers. For example, the thickness of the line may provide an indication of what letter of number is being represented. The lines may be placed adjacent to one another to form a larger number or word. A quick response code is a two dimensional bar code that may include square dots arranged in a square pattern that can include information related to the product and may also include purchasing incentive information. The codes may include purchasing incentive information that may be redeemed with the merchant when the product is purchased. The codes may be used to purchase an item online by directing the user device 102 to a merchant web site so that the product may purchased online rather than through a store. The codes may also be encrypted or encoded with purchasing incentives that may be redeemable through an online purchase.

The authorization server 106 may also validate purchasing incentives and provide them to the user device 102 based at least in part on merchant approvals. For example, purchasing incentives provided to the authorization server 106 may include directions or preferences on which users may receive the purchasing incentives. For example, merchants may want users who purchase a certain product to receive the incentive or if a user purchase exceeds a certain threshold on the amount of their purchase they will receive a purchasing incentive.

The merchant server 104 may be any processing device that may enable the user device 102 to complete a financial transaction to acquire a product or service offered by a merchant. The merchant server may include one or more processors 146 and a memory 148 which are similar to the processors 110, 124 and memories 112, 126 discussed above. Likewise, the merchant server 104 may also include network interfaces 152 and I/O interfaces 150 discussed above.

The memory 148 may include the operating system 154 that enables the processor 146 to implement a variety of tasks related to the various interfaces and modules related to selling the goods or services offered by the merchant. The memory 148 may include an operating system 154, an order module 156, an inventory module 158, a profile module 160, and a shipping module 162.

The order module 156 may perform several tasks related to the searching, selecting, and ordering of the goods and services offered by the merchant. For example, the order module 156 may receive queries from the user device 102 and provide responses to those queries that may include information related to the product such as performance or capability information and/or availability information. The order module 156 may interface with the inventory module 158 to determine availability information for the requested goods. The order module 156 may also interface with the profile module 160 to determine the preferences of the user making the request and to determine if the user qualifies for any purchasing incentives. For example, the user preferences may indicate a preference for a specific brand or brands or products within a certain price range. The preference may also include purchasing history which the profile module 160 may use to predict which products the user is more likely to buy. Following the selection of the items for purchase, the order module 156 may provide shipping options via the shipping module 162. In one embodiment, the shipping module 162 may provide estimates for delivery dates as well as cost for shipping the packaged products.

The order module 156 may also initiate a financial transaction to finalize the purchase of the good or service. In one embodiment, the order module 156 may receive payment credentials from the authorization server 106. The payment credentials may have been authorized using the biometric procedures using voice files as described above. Hence, the payment credentials may include the bank account information, credit card information, or financial service information to finalize the purchase.

Figure 2:
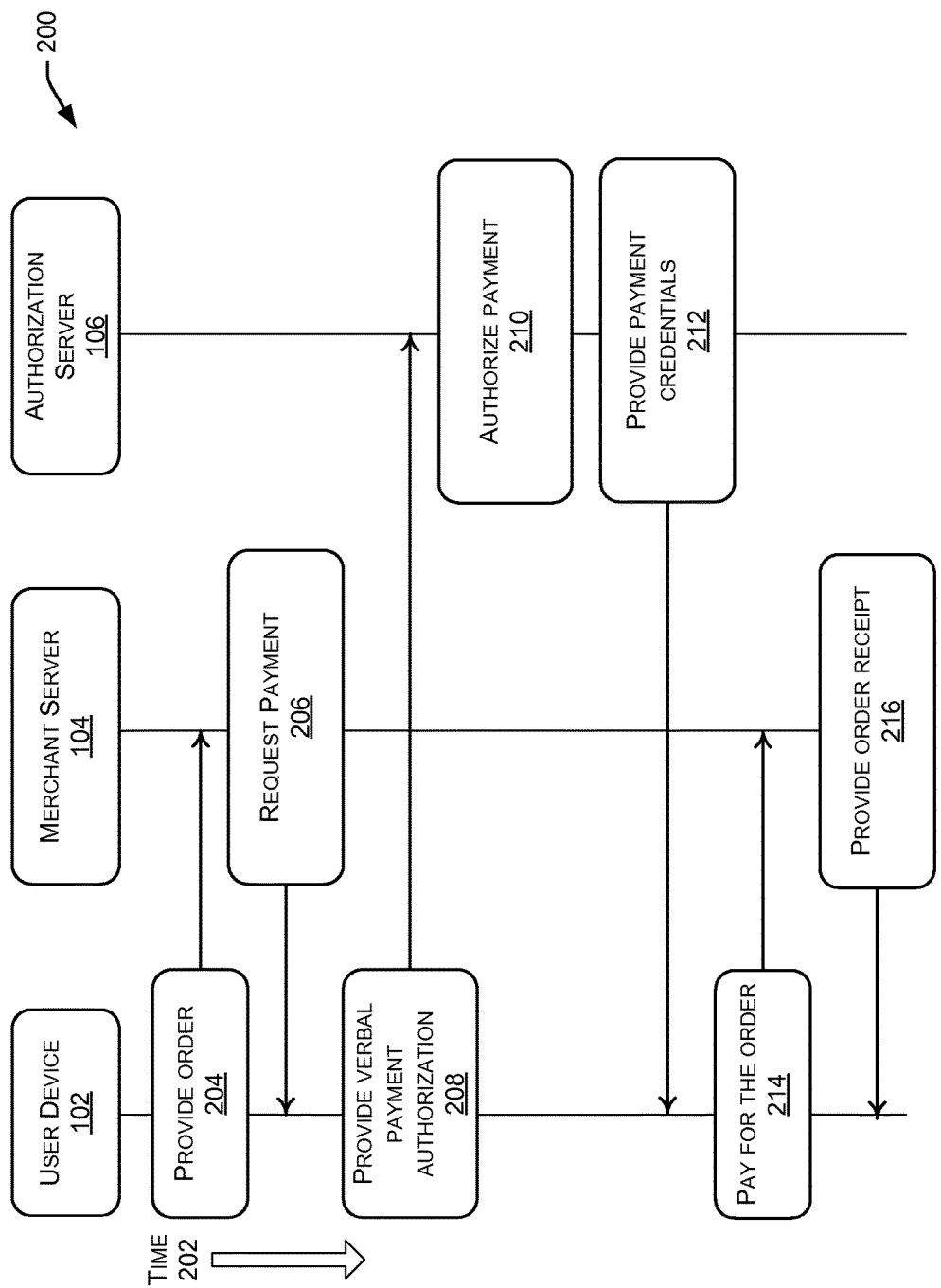
FIG. 2 illustrates a flow diagram of an example process for communicating with a consumer device, according to an example embodiment of the disclosure.

FIG. 2 illustrates a flow diagram 200 of an example process for communicating with the user device 102, the merchant server 104, and the authorization server 106. In this embodiment, the flow diagram 200 includes a time axis 202 which provides a timing indication for the process. The time axis 202 increases in time as you move in the direction of the arrow. In this way, the processes performed towards the top of the flow diagram 200 may be performed before the processes at the bottom.

At block 204, the user device 102 may provide order information to the merchant server 104. Although illustrated as a single block, the order information exchange between the user device 102 and the merchant server 104 may include several iterations of search queries and product information displays until the user may select one or more specific goods or services to purchase. In this embodiment, the order information may include the specific goods and services the user intends to purchase.

At block 206, the merchant server 104 requests payment information from the user device 102.

At block 208, the user device 102 may initiate payment authorization using the voice recognition module 122. For example, the user device 102 may ask the user to provide an authorization phrase that may be used to validate the user's identity. The user may provide their name or a specific phrase for the voice recognition module 122 to analyze to determine if the phrase or name is correct. When the user is validated, the user device 102 may provide a recording of the name or phrase to the authorization server 106 to authenticate the vocal recording against another sample stored on the authorization server 106.

At block 210, the authorization server 106 may use the biometric module 138 to analyze the vocal recording and compare the results against another vocal recording to determine that the content (e.g., the phrase or name) is correct. The biometric module 138 may determine if the vocal signature between the two recordings is similar to within certain likelihood. In one instance, the certain likelihood may include a similarity threshold that will deem the recording authenticate and authorize the release of the payment credentials.

At block 212, the authorization server 106 may provide the payment credentials to the user device 102. The payment credentials may include a bank account number, a credit card number, or a financial services account name or number. In one embodiment, the authorization server 106 may also include an indication of the authorization provided by the authorization service. The indication may include an encrypted key or token that is shared between the authorization service and the merchants. For example, the merchants may require that a purchase includes the key or token in order to finalize the transaction. The key or token may represent that the authorization service has authenticated the user and that the purchase is less likely to be fraudulent.

At block 214, the user device 102 may provide the payment credentials to the merchant server 104 to finalize the transaction. In another embodiment, the user device 102 may also include the key or token from the authorization server 106 as evidence that the transaction has been properly authenticated.

At block 216, the merchant server 104 may finalize the transaction upon receiving the payment credentials and/or the key or token. The merchant server 104 may contact a payment processor or a financial entity to complete the financial portion of the transaction. Following a successful confirmation of the transaction, the merchant server 104 may provide a receipt for the transaction to the user device 102.

Figure 3:
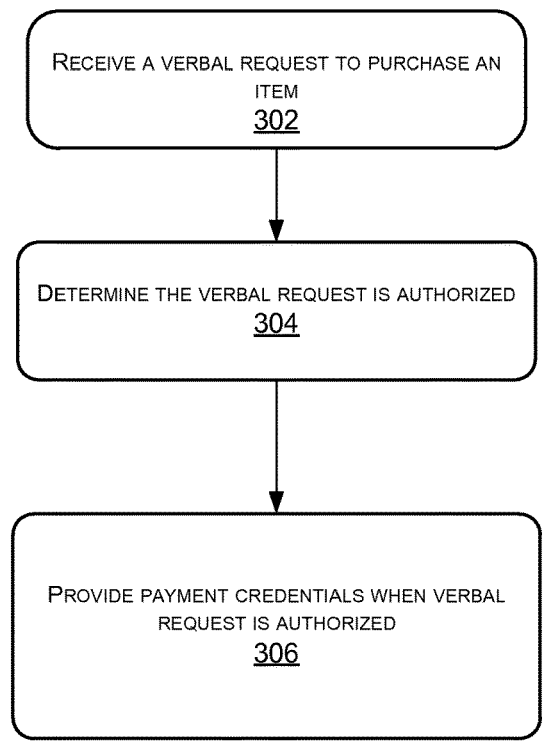
FIG. 3 illustrates a flow diagram of an example process for authorizing a payment transaction, according to an example embodiment of the disclosure.

FIG. 3 illustrates a flow diagram 300 of an example process for authorizing a payment transaction for a good or service being offered by a merchant.

At block 302, the authorization server 106 may receive a verbal request to purchase an item from a merchant. The verbal request may include a voice recording of a name or an authorization phrase.

At block 304, the authorization server 106 may determine that the verbal request is authorized. In one embodiment, the vocal recording may be compared against a similar vocal recording stored on the authorization server 106. If the comparison indicates that the recordings are above a predetermined threshold for similarity, the request may be authorized. The comparison may analyze the content of the recording to determine that the content is similar and the vocal signatures of the two recordings are similar.

At block 306, when the request is authorized, the authorization server 106 may provide the payment credentials to the user device 102. The payment credentials may include a bank account number, a credit card number, or a financial services account name or number.

Figure 4:
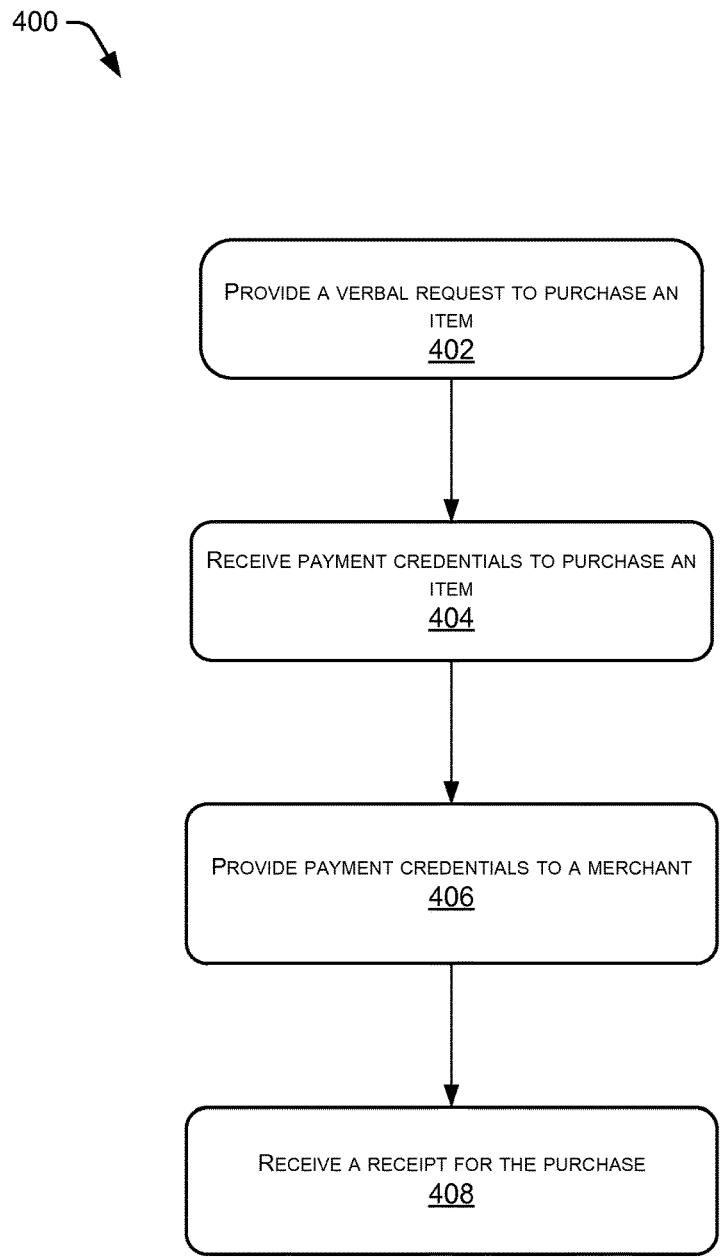
FIG. 4 illustrates a flow diagram of an example process for initiating and completing a payment transaction, according to an example embodiment of the disclosure.

FIG. 4 illustrates a flow diagram 400 of an example process for initiating and completing a payment transaction, according to an example embodiment of the disclosure.

At block 402, the user device 102 may provide a verbal request to purchase an item to the authorization server 106. The authorization server 106 may authenticate the request and determine the request in not fraudulent.

At block 404, the user device may receive one or more payment credentials from the authorization server 106. The payment credentials may include a bank account number, a credit card number, or a financial services account name or number. The payment credentials may also include a key or token from the authorization server 106 that provide evidence that the payment credentials are authenticate.

At block 406, the user device 102 may provide the payment credentials to the merchant server 104 to finalize the purchasing transaction.

At block 408, the user device 102 may receive a receipt for the purchase transaction from the merchant server 104.

The disclosure above with reference to block and flow diagrams of systems, methods, apparatuses, and/or computer program products according to example embodiments of the disclosure. It will be understood that one or more blocks of the block diagrams and flow diagrams, and combinations of blocks in the block diagrams and the flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the disclosure.

Various block and/or flow diagrams of systems, methods, apparatuses, and/or computer program products according to example embodiments are described above. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments.

These computer-executable program instructions may be loaded onto a special purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, some embodiments may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special purpose, hardware-based computer systems that perform the specified functions, elements or steps, or combinations of special purpose hardware and computer instructions.

Many modifications and other embodiments set forth herein will be apparent having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The claimed invention is:

1. A computer-implemented method, comprising:
    receiving an order, from a user device via a payment transaction service provider system comprising one or more computers, for one or more goods or services to be purchased from an online marketplace;
    requesting, from the user device via the payment transaction service provider system, payment information, wherein the payment information comprises at least one payment instrument;
    analyzing, via the payment transaction service provider system, a user device validated voice recording of a user transmitted from the user device;
    validating, via the payment transaction service provider system, the user device validated voice recording by comparing the user device validated voice recording to a sample voice recording of the user, wherein the sample voice recording is accessed by the payment transaction service provider system;
    communicating, via the payment transaction service provider system to the user device, an indication of payment authorization based on the validating of the user device validated voice recording, wherein the indication of payment authorization comprises an encrypted key or token that is indicative of an authentication of the user; and
    communicating, via the payment transaction service provider system to a merchant server, a payment credential based on the validating of the user device validated voice recording, wherein the payment credential comprises the encrypted key or token, further wherein the merchant server is configured to authorize the order for the one or more goods or services based on the payment credential.

2. The computer-implemented method of claim 1, wherein the user device validated voice recording comprises a word or an authorization phrase.

3. The computer-implemented method of claim 1, further comprising:
    receiving, by the payment transaction service provider system, an indication that the user device is authorized by a merchant to receive a purchasing incentive; and
    associating, by the payment transaction service provider system, the purchasing incentive with the payment credential based on the indication.

4. The computer-implemented method of claim 1, wherein the payment credential comprises at least one of:

i) a bank account number;
ii) a credit card account number; or
iii) a financial services account identifier.

5. One or more computer-readable media comprising computer-executable instructions that in response to execution by one or more processors, configures the one or more processors to perform operations comprising:
   receiving an order for one or more goods or services to be purchased from an online marketplace;
   requesting payment information, wherein the payment information comprises at least one payment instrument;
   analyzing a user device validated voice recording of a user transmitted from a user device;
   validating user device validated voice recording by comparing the user device validated voice recording to a sample voice recording of the user;
   communicating, to the user device, an indication of payment authorization based on the validating of the user device validated voice recording, wherein the indication of payment authorization comprises an encrypted key or token that is indicative of an authentication of the user; and
   communicating, to a merchant server, a payment credential based on the validating of the user device validated voice recording, wherein the payment credential comprises the encrypted key or token, further wherein the merchant server is configured to authorize the order for the one or more goods or services based on the payment credential.

6. The one or more computer-readable media of claim 5, wherein the user device validated voice recording comprises a word or an authorization phrase.

7. The one or more computer-readable media of claim 5, the operations further comprising:
   receiving an indication that the user device is authorized by a merchant to receive a purchasing incentive; and
   associating the purchasing incentive with the payment credential based at least in part on the indication.

8. The one or more computer-readable media of claim 5, wherein the payment credential comprises at least one of:
   i) a bank account number;
   ii) a credit card account number; or
   iii) a financial services account identifier.

* * * * *